United States Patent
Usui et al.

(10) Patent No.: US 6,562,265 B2
(45) Date of Patent: May 13, 2003

(54) CORRECTION METHOD FOR A CONTROL APPARATUS CONTROLLING AN INJECTION MOLDING MACHINE

(75) Inventors: Kazuo Usui, Nagano (JP); Susumu Morozumi, Nagano (JP)

(73) Assignee: Nissei Plastic Industrial Co., Ltd., Nagano-Ken (JP)

(*) Notice: Subject to any disclaimer, the term of this patent is extended or adjusted under 35 U.S.C. 154(b) by 222 days.

(21) Appl. No.: 09/799,603

(22) Filed: Mar. 7, 2001

(65) Prior Publication Data

US 2001/0042934 A1 Nov. 22, 2001

(30) Foreign Application Priority Data

Mar. 7, 2000 (JP) ........................................ 2000-062227

(51) Int. Cl.⁷ ............................................... B29C 45/77
(52) U.S. Cl. ................................. 264/40.5; 264/328.1
(58) Field of Search ............................ 264/40.5, 328.1; 425/145

(56) References Cited

U.S. PATENT DOCUMENTS 5,567,367 A * 10/1996 Ito et al. ..................... 264/40.1
5,997,780 A * 12/1999 Ito et al. ..................... 264/40.5
6,461,139 B1 * 10/2002 Yokoya et al. ............... 425/149
2001/0020382 A1 * 9/2001 Usui et al. .................... 73/1.57

FOREIGN PATENT DOCUMENTS

| JP | 3-221428 | * 9/1991 |
| JP | B2767720 | 7/1995 |
| JP | B22657352 | 6/1997 |

* cited by examiner

Primary Examiner—Jill L. Heitbrink
(74) Attorney, Agent, or Firm—Birch, Stewart, Kolasch & Birch, LLP

(57) ABSTRACT

In a correction method for correcting a pressure detection value output from a pressure detector used in a control apparatus which controls an injection molding machine, the screw of the injection molding machine is rotated by one turn in a period in which molding operation is not performed, and a middle value between the minimum value and the maximum value of a pressure detection value output from the pressure detector during the rotation is obtained. The screw is rotated further and is stopped when the pressure detection value becomes equal to the middle value. The pressure detection value output from the pressure detector after stoppage of the screw undergoes correction.

7 Claims, 4 Drawing Sheets

CORRECTION METHOD FOR A CONTROL APPARATUS CONTROLLING AN INJECTION MOLDING MACHINE

BACKGROUND OF THE INVENTION

1. Field of the Invention

The present invention relates to a correction method for a control apparatus controlling an injection molding machine, which method corrects a pressure detection value output from a pressure detector such as a load cell.

2. Description of the Relevant Art

As disclosed in Japanese Patent Publication (kokoku) No. 7(1995)-67720, in general, a control apparatus for controlling an injection molding machine includes a pressure control system which controls pressure such as injection pressure or back pressure, through feedback control, on the basis of a preset pressure command value and a pressure detection value output from a pressure detector such as a load cell. Such a control apparatus performs zero-point adjustment for the pressure detection value output from the pressure detector (load cell), in order to compensate for variation in the characteristics of the pressure detector itself and a mechanical error present at a portion where the pressure detector is attached. However, since the zero point set through an initial adjustment frequently drifts due to, for example, change in the external environment or long-term variation, in general, zero-point adjustment (re-adjustment) is performed regularly or as needed.

An example method for performing such zero-point adjustment is disclosed in Japanese Patent No. 2657352. In this method, a pressure detection value is obtained in a predetermined period during operation of an injection molding machine in which the pressure detection value theoretically becomes zero, such as a predetermined period after completion of initialization performed when power is activated or a predetermined period after completion of an injection step; and correction is performed on the basis of the thus-obtained pressure detection value.

In the above-described conventional method, since a pressure detection value is obtained in a period in which the pressure detection value theoretically becomes zero, optimal conditions are set in terms of period. However, in actuality, even in such a period, the pressure detection value varies depending on the state of the screw.

That is, when the screw is rotated in a state in which no pressure acts on the screw, as shown in FIG. 2, periodically-changing ripples, which are peculiar to each injection molding machine, are superimposed on a pressure detection value Pd output from a pressure detector, due to an error in a mechanism including a screw and a heating cylinder. Since the conventional method cannot avoid the error due to ripples, there is a limit in securing accuracy and stability of correction. In FIG. 2, a period from ts to ta and a period from ta to tb each represents one turn (revolution) of the screw.

SUMMARY OF THE INVENTION

An object of the present invention is to provide a correction method for a control apparatus controlling an injection molding machine, which method always secures a high degree of accuracy and stability in correction of a pressure detection value.

In order to achieve the object as described above, a correction method of the present invention comprises the steps of: rotating the screw by one turn in a period in which molding operation is not performed; obtaining a middle value between the minimum value and the maximum value of a pressure detection value output from the pressure detector during the rotation; rotating the screw further and stopping the screw when the pressure detection value output from the pressure detector becomes equal to the middle value; and correcting the pressure detection value output from the pressure detector after stoppage of the screw.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

First, the configuration of an injection molding machine M equipped with a control apparatus 1 which can perform a correction method according to the present embodiment will be described with reference to FIGS. 3 and 4.

Figure 3:
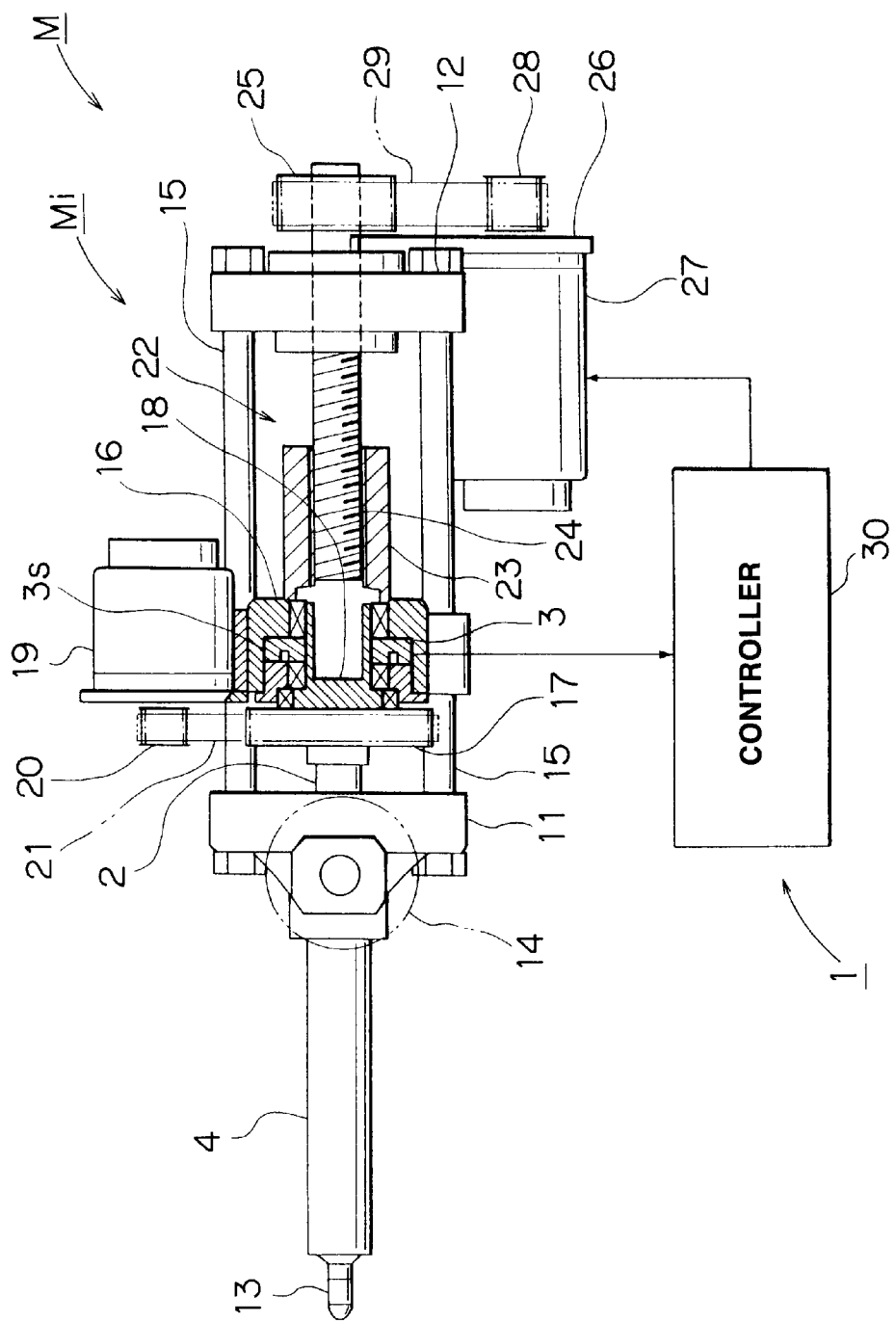
FIG. 3 is a partially-sectioned plan view of an injection molding machine equipped with a control apparatus which can carry out the correction method.

The injection molding machine M shown in FIG. 3 includes only an injection unit Mi, with a mold-clamping apparatus omitted. The injection unit Mi includes an injection base 11 and a drive base 12, which are disposed to be separated from each other. The rear end of a heating cylinder 4 is attached to the front face of the injection base 11. The heating cylinder 4 has an injection nozzle 13 at its front end and a hopper 14 at its rear portion. Molding material is supplied to the heating cylinder 4 from the hopper 14. A screw 2 is inserted into the heating cylinder 4. Four tie bars 15 are disposed to extend between the injection base 11 and the drive base 12; and a slide block 16 is slidably mounted on the tie bars 15. A rotary block 18 having a driven pulley 17 formed integrally therewith is rotatably supported at the front end of the slide block 16; and the rear end of the screw 2 is connected to the center of the rotary block 18. A servomotor 19 for screw rotation is attached to a side surface of the slide block 16; and an endless timing belt 21 is extended between and wound around the driven pulley 17, and a drive pulley 20 fixed to the rotary shaft of the servomotor 19. Thus, a drive mechanism for rotating the screw 2 is constructed.

A nut member 23 is attached to the rear end of the slide block 16 to be coaxial with the screw 2; and a front-side portion of a ball screw 24 rotatably supported on the drive base 12 is in screw-engagement with the nut member 23. Thus, a ball-screw mechanism 22 is constructed. Moreover, a driven pulley 25 is attached to the rear end of the ball screw 24 projecting rearward from the drive base 12; and a servomotor 27 for screw reciprocation is attached to a support plate 26 attached to the drive base 12. An endless timing belt 29 is extended between and wound around the driven pulley 25, and a drive pulley 28 fixed to the rotary shaft of the servomotor 27. Thus, a drive mechanism for reciprocating the screw 2 is constructed.

Figure 4:
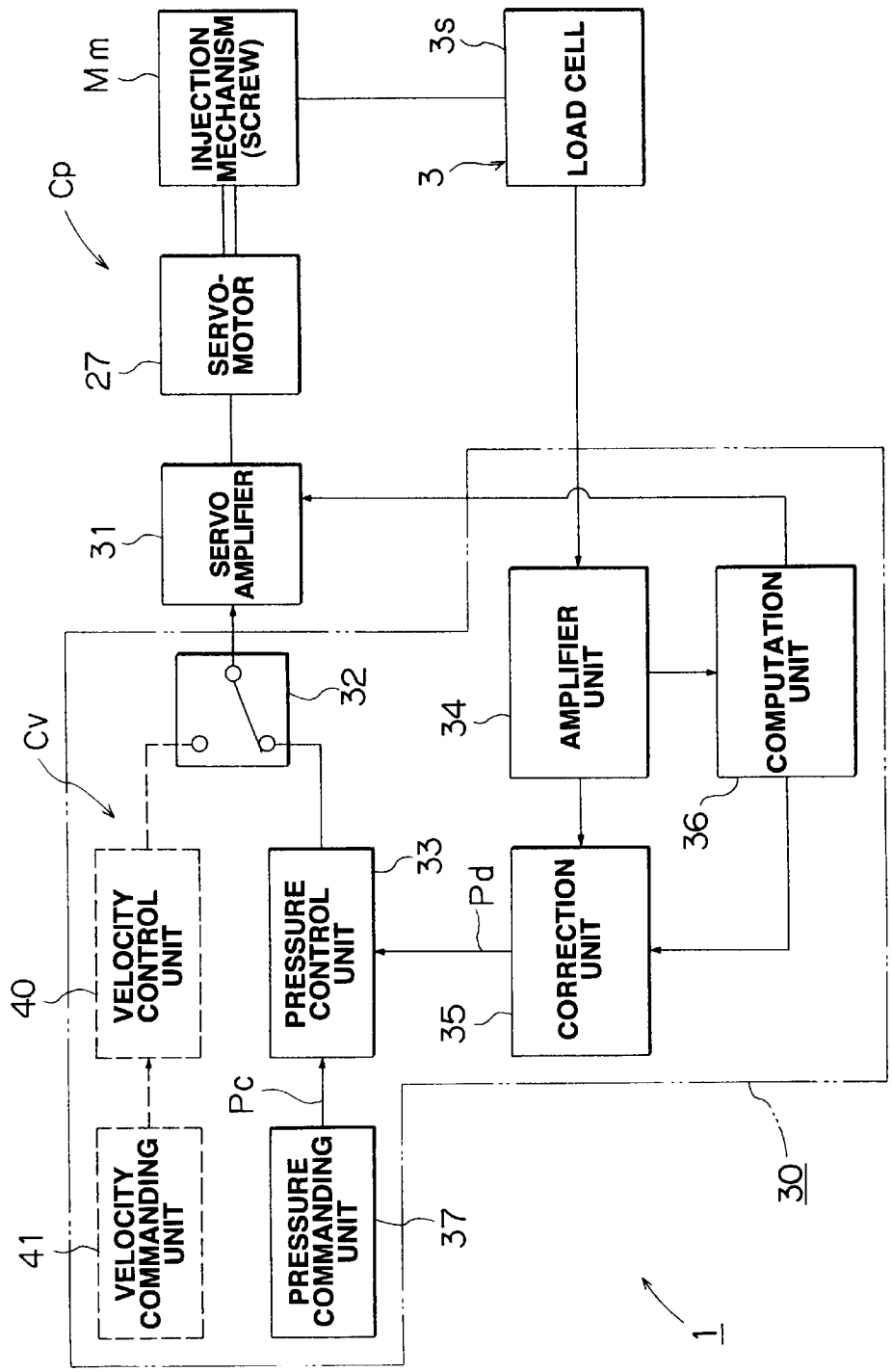
FIG. 4 is a block diagram showing a main portion of the control apparatus.

Reference numeral 1 denotes a control apparatus which includes a pressure control system Cp (FIG. 4). Reference numeral 3s denotes a load cell (pressure detector 3) for detecting pressure applied to the screw 2. The load cell 3s is interposed between the rotary block 18 and the slide block 16 and is connected to a controller 30 for driving and controlling the servomotor 27 for screw reciprocation.

FIG. 4 is a block diagram showing a specific structure of the controller 30. In FIG. 3, reference numeral 27 denotes the above-described servomotor; and reference character Mm denotes an injection mechanism including the screw 2 and the ball screw mechanism 22 driven by the servomotor 27. The servomotor 27 is connected to the output section of a servo amplifier 31; and the input section of the servo amplifier 31 is connected to the output section of a pressure control unit 33 via a switch function unit 32. The load cell 3s is connected to the input section of an amplifier unit 34; and the output section of the amplifier unit 34 is connected to the input section of a correction unit 35 and the input section of a computation unit 36. Processing in the correction unit 35 and processing in the computation unit 36 are performed by means of a computer function of the controller 30. The output section of the correction unit 35 is connected to the input section of the pressure control unit 33. A pressure command value Pc is supplied from a pressure commanding unit 37 to the pressure control unit 33. The output section of the computation unit 36 is connected to the servo amplifier 31 and the correction unit 35. Reference character Cv denotes a velocity control system including a velocity control unit 40 and a velocity commanding unit 41. When velocity control is effected by the velocity control system Cv, the switch function unit 32 is operated to connect the velocity control unit 40 to the servomotor 31.

Figure 1:
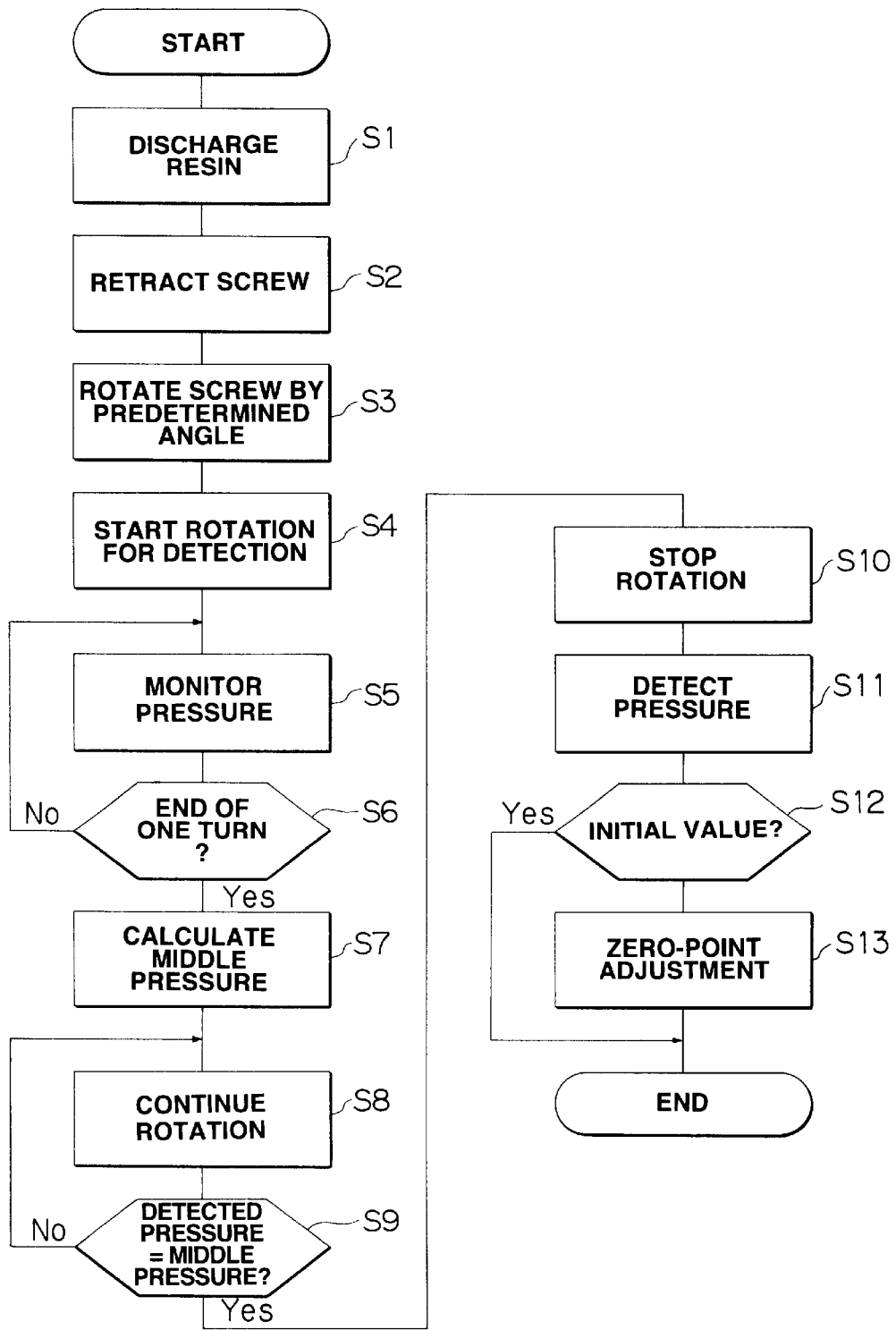
FIG. 1 is a flowchart showing the steps of a correction method according to an embodiment of the present invention.

Next, the correction method according to the present embodiment implemented in the control apparatus 1 will be described with reference to FIGS. 2 to 4 and in accordance with the flowchart shown in FIG. 1.

First, the pressure detection value Pd at the zero point is detected in a period in which molding operation is not performed. Specifically, detection of the pressure detection value Pd can be performed after completion of a predetermined molding step or in a period during operation of the injection molding machine M in which the pressure detection value Pd theoretically becomes zero. First, the controller 30 advances the screw 2 in order to discharge from the injection nozzle 13 resin remaining within the heating cylinder 4 (step S1). Subsequently, the controller 30 retracts the screw 2 slightly in order to remove residual load which acts from the front side and which is produced by resin which has not been discharged (step S2). Further, the controller 30 rotates the screw 2 by a predetermined angle (e.g., about 180°) in order to remove residual load which acts from the circumferential direction and which is produced by mechanical parts such as bearings (step S3). The above-described processing is a preparation for detection of pressure at the zero point.

Subsequently, the controller 30 rotates the screw 2 by one turn or more (step S4). This rotation of the screw 2 may be performed continuously after the rotation of the screw 2 effected in step S3 without stoppage. During this rotation, the pressure applied to the screw 2 is detected by use of the load cell 3s. The detection signal output from the load cell 3s is fed to the amplifier unit 34, where the detection signal is amplified and noise is removed from the detection signal by a noise filter. Thus, a pressure detection value Pd indicative of the detected pressure is obtained. The pressure detection value Pd is fed to the correction unit 35 and the computation unit 36.

Figure 2:
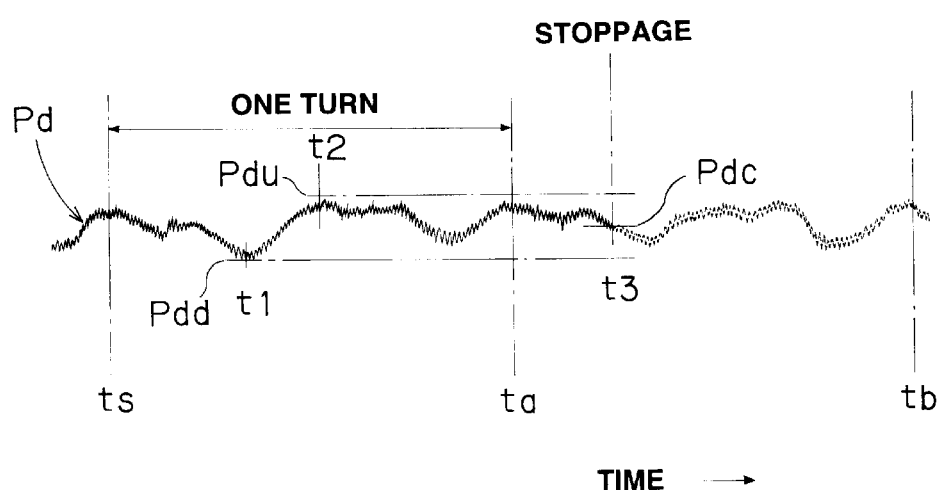
FIG. 2 is a time chart showing variation in pressure detected when the correction method is performed.

As shown in FIG. 2, the pressure detection value Pd obtained at this time represents an error caused by ripples produced with rotation of the screw 2. Therefore, the computation unit 36 monitors the pressure detection value Pd indicative of the detected pressure (step S5) in order to detect the minimum value Pdd and the maximum value Pdu of the pressure detection value Pd during the rotation. That is, when it is assumed that time ts in FIG. 2 is a time at which rotation to be performed over one turn or more has started in step S4, the computation unit 36 monitors the pressure detection value Pd in a period from the time ts to time ta at which the screw 2 has rotated one turn. After the screw 2 has rotated one turn, the computation unit 36 detects the minimum value Pdd and the maximum value Pdu of the pressure detection value Pd, and, through calculation, obtains a middle value Pdc between the minimum value Pdd and the maximum value Pdu (steps S6, S7). The middle value Pdc is not necessarily the center between the minimum value Pdd and the maximum value Pdu, but may be offset from the center at a predetermined ratio, toward the minimum value Pdd or toward the maximum value Pdu.

While the screw 2 is rotated continuously, the computation unit 36 monitors the pressure detection value Pd. When the monitored pressure detection value Pd reaches the above-described middle value Pdc, the controller 30 stops the screw 2 (steps S8, S9, S10). In the case shown in FIG. 2, the pressure detection value Pd reaches the middle value Pdc at time t3 after the time ta. Therefore, the controller 30 stops the screw 2 at the time t3. When the screw 2 has stopped, the controller 30 detects the pressure acting on the screw 2; i.e., the pressure detection value Pd (step S11). Then, the controller 30 judges whether the origin point has shifted from the obtained pressure detection value Pd.

When the pressure detection value Pd assumes an initial value (zero) (i.e., when the origin point has not shifted), zero-point adjustment is unnecessary (step S12). By contrast, when the pressure detection value Pd assumes a value different from the initial value (i.e., when the origin point has shifted), the correction unit 35 performs zero-point adjustment (correction) such that the pressure detection value Pd assumes the initial value (step S13).

As described above, in the correction method according to the present embodiment, the screw 2 is rotated by one turn in a period in which molding operation is not performed; a middle value Pdc between the minimum value Pdd and the maximum value Pdu of a pressure detection value Pd output from the load cell 3s during the rotation is obtained; the rotation of the screw 2 is continued and is stopped when the pressure detection value Pd becomes equal to the middle value Pdc; and the pressure detection value Pd output from the pressure detector after stoppage of the screw 2 is corrected. Therefore, a high degree of accuracy and stability can always be secured in correction of the pressure detection value Pd.

The basic operation of the pressure control system Cp will be described. When the pressure detection value Pd is fed to the input section of the pressure control unit 33, the pressure control unit 33 compares the pressure detection value Pd with the pressure command value Pc fed from the pressure commanding unit 37, in order to obtain a deviation. The pressure control unit 33 produces a control signal for eliminating the deviation. The control signal is fed to the servomotor 27, whereby feedback control for pressure is effected.

While the present invention has been described with reference to the preferred embodiment, the present invention is not limited thereto. Regarding structural details, shape, technique, among others, modifications and any omission or addition may be possible as needed without departing from the scope of the invention. For example, in the embodiment, zero-point adjustment is performed as correction. However the present invention can be applied to cases in which correction other than zero-point adjustment is performed. Further, in the embodiment, before the screw 2 is rotated by one or more turns, the screw 2 is advanced in order to discharge resin remaining within the heating cylinder 4, retracted slightly, and rotated by a predetermined angle. However, this operation is not necessarily required to perform if similar operation is performed in advance, or an environment similar to that established by the operation is established in advance. In addition, sensors other than the load cell 3s may be used as the pressure detector 3.

What is claimed is:

1. A correction method for a control apparatus controlling an injection molding machine, which method corrects a pressure detection value output from a pressure detector, the method comprising the steps of:

rotating the screw by one turn in a period in which molding operation is not performed;

obtaining a middle value between the minimum value and the maximum value of a pressure detection value output from the pressure detector during the one-turn rotation;

rotating the screw further and stopping the screw when the pressure detection value output from the pressure detector becomes equal to the middle value; and correcting the pressure detection value output from the pressure detector after stoppage of the screw.

2. A correction method according to claim 1, wherein the period in which molding operation is not performed is a period after completion of a predetermined molding step.

3. A correction method according to claim 1, wherein the period in which molding operation is not performed is a period during operation of the injection molding machine in which the pressure detection value theoretically becomes zero.

4. A correction method according to claim 1, wherein before the one-turn rotation, the screw is advanced in order to discharge resin remaining in a heating cylinder and is then retracted over a predetermined distance.

5. A correction method according to claim 4, wherein after the retraction of the screw over a predetermined distance, the screw is rotated over a predetermined angle.

6. A correction method according to claim 1, wherein the pressure detector is a load cell.

7. A correction method according to claim 1, wherein the correction is zero-point adjustment.

* * * * *